(12) United States Patent
Clevorn et al.

(10) Patent No.: US 10,523,360 B2
(45) Date of Patent: Dec. 31, 2019

(54) METHODS AND DEVICES FOR PROVIDING A ROBUST DATA COMMUNICATION BETWEEN A CLIENT AND A SERVER

(71) Applicant: Intel IP Corporation, Santa Clara, CA (US)

(72) Inventors: Thorsten Clevorn, Munich (DE); Jan Ellenbeck, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 52 days.

(21) Appl. No.: 15/738,060

(22) PCT Filed: May 20, 2016

(86) PCT No.: PCT/EP2016/061449
§ 371 (c)(1),
(2) Date: Dec. 19, 2017

(87) PCT Pub. No.: WO2016/206877
PCT Pub. Date: Dec. 29, 2016

(65) Prior Publication Data
US 2018/0234207 A1    Aug. 16, 2018

(30) Foreign Application Priority Data

Jun. 22, 2015  (DE) .................. 10 2015 109 951

(51) Int. Cl.
*H04L 1/00*    (2006.01)
*H04W 72/12*   (2009.01)
*H04W 28/02*   (2009.01)

(52) U.S. Cl.
CPC .......... *H04L 1/0026* (2013.01); *H04L 1/0003* (2013.01); *H04L 1/0015* (2013.01);
(Continued)

(58) Field of Classification Search
CPC ... H04L 1/0026; H04L 1/0003; H04L 1/0015; H04L 1/0036; H04W 72/1226; H04W 28/0231
See application file for complete search history.

(56) References Cited

U.S. PATENT DOCUMENTS

| | | | |
|---|---|---|---|
| 2008/0049813 A1* | 2/2008 | Kurose | ............... H04L 1/0016 375/141 |
| 2009/0201861 A1* | 8/2009 | Kotecha | ............... H04L 1/0027 370/329 |

(Continued)

FOREIGN PATENT DOCUMENTS

| | | |
|---|---|---|
| WO | WO-2008039856 A2 | 4/2008 |
| WO | WO-2010033704 A2 | 3/2010 |

(Continued)

OTHER PUBLICATIONS

"International Application Serial No. PCT/EP2016/061449, International Search Report dated Jul. 20, 2016", 4 pgs.

(Continued)

*Primary Examiner* — Will W Lin
(74) *Attorney, Agent, or Firm* — Schwegman Lundberg & Woessner, P.A.

(57) ABSTRACT

A method at a client includes monitoring a data connection to a server, adjusting a value of a channel quality indicator based on the detection of a start of a data transmission from the server, and transmitting the adjusted value of the channel quality indicator to the server.

22 Claims, 7 Drawing Sheets

(52) U.S. Cl.
CPC ....... *H04L 1/0036* (2013.01); *H04W 28/0231* (2013.01); *H04W 72/1226* (2013.01)

(56) References Cited

U.S. PATENT DOCUMENTS

| | | | | |
|---|---|---|---|---|
| 2010/0067396 A1* | 3/2010 | Cui | ........................ | H04L 1/0026 370/252 |
| 2011/0206098 A1* | 8/2011 | Lindoff | ................. | H04L 1/0003 375/219 |
| 2012/0063523 A1* | 3/2012 | Jitsukawa | ............. | H04L 1/0003 375/259 |
| 2012/0207054 A1* | 8/2012 | Okubo | .................. | H04L 1/0003 370/252 |
| 2012/0276896 A1* | 11/2012 | Ren | ........................ | H04L 1/0003 455/423 |
| 2013/0033997 A1* | 2/2013 | Cheng | .................. | H04W 76/10 370/252 |
| 2013/0258877 A1* | 10/2013 | Ji | ........................ | H04B 7/0632 370/252 |
| 2013/0265960 A1* | 10/2013 | Wang | .................... | H04L 1/0026 370/329 |
| 2013/0310092 A1* | 11/2013 | Tabet | .................... | H04L 1/0003 455/501 |
| 2014/0198677 A1* | 7/2014 | Xu | ........................ | H04L 1/0026 370/252 |
| 2014/0233407 A1* | 8/2014 | Pourahmadi | .......... | H04L 5/0007 370/252 |
| 2014/0295866 A1* | 10/2014 | Cho | ........................ | H04L 5/003 455/452.1 |
| 2014/0334293 A1* | 11/2014 | Narasimha | ............ | H04W 28/08 370/229 |
| 2015/0087351 A1* | 3/2015 | Majjigi | .................. | H04W 52/52 455/522 |
| 2015/0381310 A1* | 12/2015 | Hammarwall | ........ | H04L 1/0003 370/329 |
| 2016/0156430 A1* | 6/2016 | Madan | .................. | H04L 1/0015 370/328 |
| 2016/0337072 A1* | 11/2016 | Yang | ................. | H04W 72/0413 |
| 2017/0064705 A1* | 3/2017 | Lee | ........................ | H04L 1/0026 |

FOREIGN PATENT DOCUMENTS

| | | |
|---|---|---|
| WO | WO-2011005648 A1 | 1/2011 |
| WO | WO-2016206877 A1 | 12/2016 |

OTHER PUBLICATIONS

"International Application Serial No. PCT/EP2016/061449, Written Opinion dated Jul. 20, 2016", 9 pgs.

* cited by examiner

METHODS AND DEVICES FOR PROVIDING A ROBUST DATA COMMUNICATION BETWEEN A CLIENT AND A SERVER

CROSS-REFERENCE TO RELATED APPLICATION

This application is a U.S. National Stage Filing under 35 U.S.C. 371 from International Application No. PCT/EP2016/061449, filed on May 20, 2016, now published as WO 2016/206877, which claims priority to German Patent Application No. 102015109951.9, filed Jun. 22, 2015, which applications are incorporated herein by reference in their entirety.

FIELD

The disclosure relates, in general, to wireless communications. More particular, the disclosure relates to methods and devices for providing a robust data communication between a client and a server.

BACKGROUND

A communication between a client and a server of a network may be based on a communication protocol, for example a Transmission Control Protocol (TCP). After a connection between the client and the server has been established in accordance with the communication protocol, data may be transmitted from the server to the client. For example, a file or a website may be downloaded from the server by the client. Cases may occur where a continuous data communication between the client and the server may be blocked.

Methods and devices employed in wireless communication networks constantly have to be improved. In particular, it may be desirable to provide methods that improve the performance of devices operating on the networks. In addition, it may be desirable to provide a robust data communication between these devices.

For these and further reasons there is a need for the present disclosure.

BRIEF DESCRIPTION OF THE DRAWINGS

The accompanying drawings are included to provide a further understanding of examples of the disclosure and are incorporated in and constitute a part of this specification. The drawings illustrate examples and together with the description serve to explain principles of examples. Other examples and many of the intended advantages of examples will be readily appreciated as they will become better understood by reference to the following detailed description.

DETAILED DESCRIPTION

Figure 1:
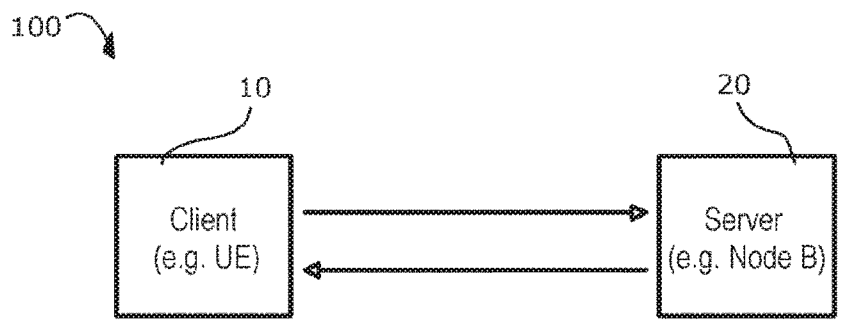
FIG. 1 schematically illustrates a wireless communication system 100 including a client 10 and a server 20.

In the following detailed description, reference is made to the accompanying drawings, which form a part thereof, and in which is shown by way of illustration examples in which the disclosure may be practiced. Other examples may be utilized and structural or logical changes may be made without departing from the scope of the present disclosure. The following detailed description, therefore, is not to be taken in a limiting sense, and the scope of the present disclosure is defined by the appended claims.

The features of the various examples described herein may be combined with each other, unless specifically noted otherwise. Further, like reference signs may designate corresponding identical or similar parts.

As employed in this specification, the terms "coupled" and/or "connected" are not meant to mean in general that the elements must be directly coupled or connected together, intervening functional elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

Devices and methods for operating devices are described herein. Comments made in connection with a described device may also hold true for a corresponding method and vice versa. For example, if a specific act of a method is described, a corresponding device for performing the method may include a component for performing the act in a suitable manner, even if such component is not explicitly described or illustrated in the figures. In addition, the features of the various aspects and examples described herein may be combined with each other, unless specifically noted otherwise.

Examples as described herein may be implemented in discrete circuits, partially integrated circuits or fully integrated circuits. Further, the examples may be implemented on a single semiconductor chip or on multiple semiconductor chips connected to each other. Furthermore, it should be understood that examples may be implemented in software or in dedicated hardware or partially in software and partially in dedicated hardware.

The methods and devices described herein may be used for various wireless communication networks. The terms "network", "system", "radio communications system" and "wireless communications system" may be used synonymously herein.

The methods and devices described herein may be implemented in wireless communication networks, in particular communication networks based on CDMA, WCDMA, an LTE and/or OFDM standard or based on a WiFi standard and in particular MIMO communication systems. The methods and devices described herein may further be implemented in a mobile device (or mobile station or User Equipment (UE)) or a base station (NodeB, eNodeB). The described devices may include integrated circuits and/or passives and may be manufactured according to various technologies. For example, the circuits may be designed as logic integrated circuits, analog integrated circuits, mixed signal integrated circuits, memory circuits and/or integrated passives, etc.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

The methods and devices described herein may utilize a channel quality indicator which may be configured to specify channel properties of a communication link. That is, a channel quality indicator may be configured to specify how a signal propagates from a transmitter to a receiver and thereby may represent the combined effect of, for example, scattering, fading and power decay with distance. A channel quality indicator may be estimated at the receiver and may be fed back to the transmitter, for example in a quantized form. In particular, a channel quality indicator may be generated by a UE and may be fed back to an eNodeB.

In one example, a channel quality indicator may include a CQI (or a CQI value). A CQI may be based on a measurement of a communication quality of one or more wireless channels. Hence, a CQI may be a value (or multiple values) representing a measure of a channel quality for a given channel. In general, the term CQI may refer to channel information provided by the transmitter or the receiver. In particular, the term CQI may refer to channel quality information determined at a UE which may be fed back to an eNodeB and processed by the eNodeB. In this regard, the CQI may thus be configured to indicate the quality of a downlink channel. A high value of the CQI may be indicative of a channel with high quality and vice versa. In LTE, a value of a CQI may e.g. lie in a range from 0 to 15, wherein a value of 0 denotes the lowest channel quality and a value of 15 denotes the highest channel quality. A CQI may be determined by utilizing values of a Signal-to-Noise Ratio (SNR), Signal-to-Interference plus Noise Ratio (SINR), Signal-to-Noise plus Distortion Ratio (SNDR), a Signal to Leakage plus Noise Ratio (SNLR), etc. of a channel.

A channel quality indicator may be configured to support link adaptation in order to achieve reliable communications with high data rates. Based on a channel quality indicator received from a UE, an eNodeB may determine on which modulation and coding scheme a communication between the UE and the eNodeB may be based. The methods and devices described herein may utilize such modulation and coding scheme which may shortly be referred to as MCS. An MCS index may e.g. be used by the eNodeB to signal to the UE the modulation and coding scheme to use for receiving or transmitting a certain transport block. Each MCS index may stand for a certain modulation order and transport block size index. The transport block size may be used to derive the transport block size for a given resource block allocation. In one example, the value of the MCS index may lie in a range from 0 to 31.

FIG. 1 schematically illustrates a wireless communication system or network 100 including a client 10 and a server 20. The client 10 may e.g. correspond to a User Equipment (UE) which may represent any kind of mobile phone, smartphone, laptop computer, tablet, cellular modem, video-game console, etc. The UE may also be referred to as mobile terminal, mobile device, mobile station, etc. The server 2D may e.g. correspond to a NodeB which may also be referred to as base station, eNodeB, base transceiver station, etc. For example, the network 100 may be based on LTE, 3G, WiFi, etc.

A communication between the client 10 and the server 20 may be based on a communication protocol. In one example, such communication protocol may correspond to a Transmission Control Protocol (TCP) which may be regarded as a protocol of the Internet protocol suite (IP). In this regard, TCP may also be referred to as TCP/IP. The TCP may provide reliable, ordered and error-checked delivery (or notification of failure to deliver) of transmission data between programs running on devices that may be connected to a local area network, an intranet or the public Internet. The transmission data may correspond to pieces of information that may be referred to as packets. In particular, a packet may be a sequence of octets (bytes) and may include a header followed by a body. The header may identify the source and destination of the packet and may further include control information. The body of the packet may include the data to be transmitted in particular, the TCP may reside at the transport layer. For example, the TCP may be used by web browsers when the browser connects to servers on the World Wide Web. The TCP may particularly be employed to deliver email and transfer files from one location to another. Communication protocols encapsulated in TCP are, for example, HTTP, HTTPS, SMTP, POP3, IMAP, SSH, FTP, Telnet, etc.

A TCP connection between the client 10 and the server 20 may be established based on a three-way handshake. In a first act, the client 10 may send a SYN data packet to the server 20 on the network 100 or an external network. The objective of the SYN data packet may be to query whether the server 20 is open for a new connection. When the server 20 receives the SYN packet from the client 10, the server 20 may respond and return a confirmation receipt in a second act. The confirmation receipt may correspond to an ACK data packet or SYN/ACK data packet. The client 10 may receive the SYN/ACK data packet from the server 20 and may respond with an ACK data packet in a third act. Upon completion of the described three acts (or "handshakes"), both the client 10 and the server 20 have received an acknowledgment of the connection such that a connection is created and a full-duplex communication may be established in order to provide a transmission of data in both directions between the client 10 and the server 20 simultaneously.

It is noted that herein the terms "server" and "base station" (or "NodeB", etc.) as well as the terms "client" and "mobile station" (or "UE", etc.) may be interchangeably used, even though a communication between a TCP server (such as e.g. an FTP internet server) and a TCP client (such as e.g. an FTP client running on an application processor of a UE) and a communication between a base station and a UE may be based on different layers. For example, a communication between a TCP server and a TCP client may be based on a TCP layer while a communication between a base station and a UE may be based on a PRY layer (or physical layer or layer 1). A communication between a TCP server and a TCP client may e.g. include ACK data packets in the uplink (UL TCP ACES), TCP data packets in the downlink (DL TCP data), etc. Further, a communication between a base station and a mobile station may e.g. include NACK data packets in the uplink (PHY NACK), scheduling requests in the uplink, CQI values in the uplink, etc. As such, on a PHY level, a base station may be regarded as a server for a wireless link to a mobile station while, on a TCP level, e.g. an FTP server may be regarded as a server for a communication with an FTP client. For the sake of simplicity, a detailed designation and/or distinction of employed layers may thus be omitted at some points of this specification.

Figure 2A:
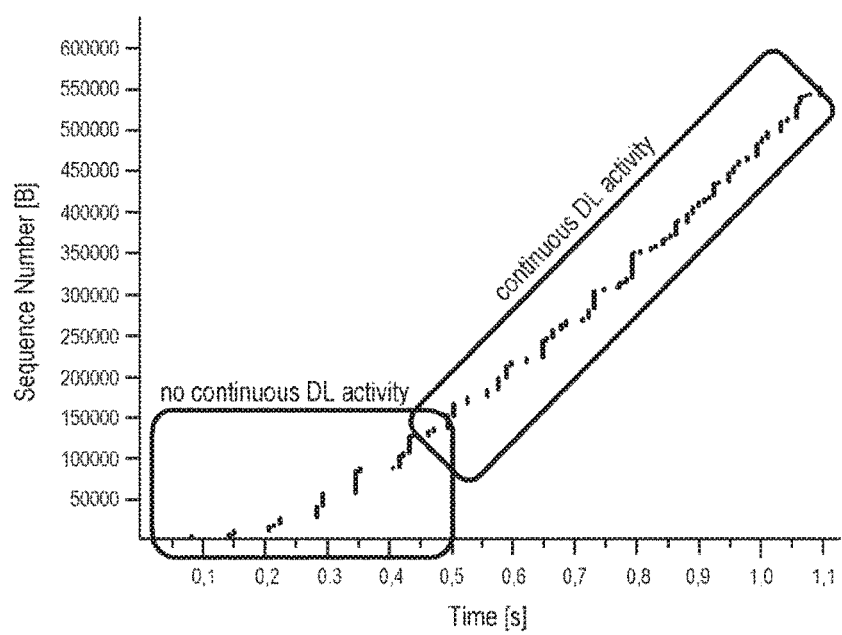
FIG. 2A shows a time/sequence diagram of a data communication between a server and a client in a first scenario.

FIG. 2 includes FIGS. 2A to 2D which illustrate a data communication between a client 10 and a server 20 in a first scenario. FIG. 2A shows a time/sequence diagram of the data communication. The horizontal axis of the diagram represents time in seconds while the vertical axis represents a throughput of data successfully transmitted from the server 20 to the client 10, i.e. the rate of successful message delivery via the radio communication channel. In FIG. 2A, the vertical axis particularly represents the number of sequences or data packets that are transmitted by the server 20 and successfully received at the client 10. For example, the client 10 may perform a cyclic redundancy check (CRC) on received data packets. Depending on the outcome of the CRC, the client 10 may transmit an acknowledgement (ACK) of the reception or a non-acknowledgement (NACK) of the reception to the server 20. A successful reception of a data packet may thus correspond to a reception of a data packet including an acknowledgement of the reception in form of an ACK data packet sent from the client 10 to the server 20. For example, the data communication of FIG. 2A may correspond to a download of a data file from the server 20 by the client 10. The data file may e.g. correspond to a text file, a web page, an image file, etc. In FIG. 2A, it is assumed that a (full-duplex) connection between the client 10 and the server 20 has already been established. That is, FIG. 2A does not necessarily include and illustrate a data transmission related to e.g. a three-way handshake between the client 10 and the server 20.

The diagram of FIG. 2A includes a first section of data transmission labeled "no continuous DL (download or downlink) activity" followed by a second section of data transmission labeled "continuous DL activity". The discrete parts of the shown graph in the first and second section represent data packets that have been successfully received from the server 20 at the client 10. Gaps are arranged between these transmitted data packets. During the time period of a gap, there may be no data that is exchanged between the client 10 and the server 20. In particular, the transmission of the file to be downloaded by the client 10 from the server 20 may be paused. The specific data transmitted between the client 10 and the server 20 in the first section and the second section of the time/sequence diagram of FIG. 2A is described below in connection with FIGS. 2B to 2D.

As can be seen from FIG. 2A, at the beginning of a TCP transmission there may be a no continuous DL (and UL) activity during which the described gaps between received data packets may remain large. In a "good" case, after about 5 to 10 large gaps, the TCP transmission enters a continuous DL activity. However, there may also occur "bad" cases in which a data transmission between the client 10 and the server 20 may not speed up and may be somehow blocked. An example for a bad case is described in connection with FIG. 3. For a first time interval of about 0.5 seconds, i.e. in the first section of no continuous DL activity, only a small part of DL TCP data is transmitted from the server 20 to the client 10. In FIG. 2A, the gradient of the illustrated graph may particularly increase with time. An increase of the graph means that the number of data packets successfully received at the client 10 per time increases. The increase of the graph's gradient may particularly originate from a slow-start algorithm that may be used at the beginning of the TCP communication.

Figure 2B:
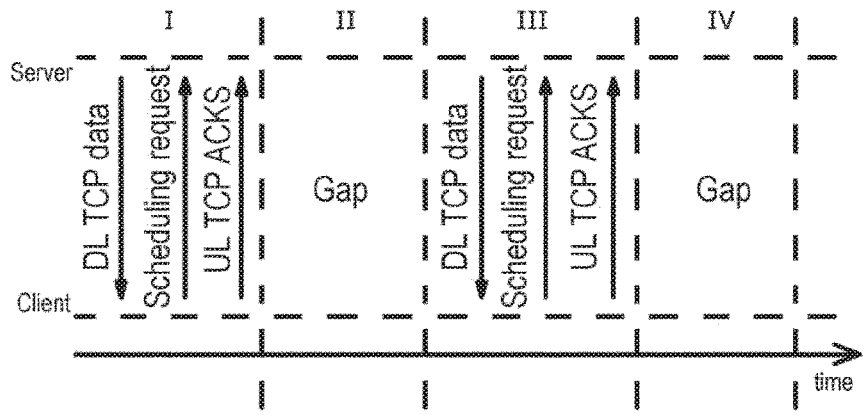
FIG. 2B schematically illustrates a data communication in a first section of the time/sequence diagram of FIG. 2A.

FIG. 2B schematically illustrates a data communication during the no continuous DL activity in the first section of the time/sequence diagram of FIG. 2A. In a first time interval I, the server 20 may transmit a DL TCP data packet to the client 10. For example, the DL TCP data packet may include a piece of a data file that is to be downloaded from she server 20 by the client 10. The DL TCP data packet may e.g. be transmitted from a TCP server so a TCP client on a TCP layer. After receiving the DL TCP data packet, the client 10 may e.g. perform a CRC of the received data. If the CRC indicates a successful data reception, the client 10 may respond with a scheduling request to transmit a TCP ACK in the UL and further to request a transmission (or the scheduling of a transmisson) of a further DL TCP data packet from the server 20 to the client 10. The client 10 may thus acknowledge the reception of the DL TCP data packet by transmitting an Uplink (UL) TCP ACK data packet to the server 20. The UL TCP ACK data packet may e.g. be transmitted from a TCP client to a TCP server on a TCP layer, and the scheduling request may be transmitted from a UE to a NodeB on a PHY layer in a second time interval II, no data is received by the client 10 from the server 20. The second interval II thus may correspond to one of the gaps in the no continuous DL activity part described in connection with FIG. 2A. A time duration $t_{cycle}$ of one cycle, i.e. between a reception of a first TCP data packet and a reception of a subsequent second TCP data packet in a "good" case may lie in a range from about 50 milliseconds to about 75 milliseconds. The time duration $t_{cycle}$ may be specified as the sum of the time duration for the first interval I and the second interval II. Alternatively, the time duration $t_{cycle}$ may be specified as the time duration between the transmission of two subsequent similar items, for example between two subsequent scheduling requests, between two subsequent UL TCP ACKS, etc.

In the following time intervals, the acts described in connection with the time intervals I and II may be repeated until the data transmission between the client 10 and the server 20 may leave the no continuous DL activity and may enter the continuous DL activity as shown in FIG. 2A. That is, a data transmission during a third time interval III may be similar to the data transmission of the first time interval I described above, a data transmission during a fourth time interval IV may be similar to the data transmission of the second time interval II described, a data transmission during a fifth time interval V (not illustrated) may be similar to the data transmission of the first time interval I, etc. The data transmission of time intervals I and II may be repeated for about 5 to 10 times until the data transmission between the client 10 and the server 20 may enter the second section of a continuous DL activity.

Figure 2C:
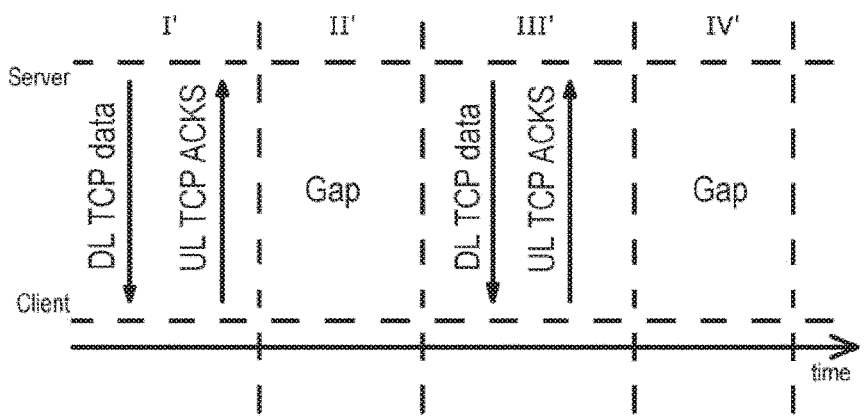
FIG. 2C schematically illustrates a data communication in a second section of the time/sequence diagram of FIG. 2A.

FIG. 2C schematically illustrates a data communication at the beginning of the continuous DL activity in the second section of the time/sequence diagram of FIG. 2A. FIG. 2C can be seen as an illustration of the data communication during a transition between the no continuous activity and the continuous activity, but it can also be seen as a simplified illustration of the data communication during the continuous activity. In a first time interval I', the server 20 may transmit a further DL TCP data packet to the client 10. After receiving the DL TCP data packet, the client 10 may acknowledge the reception of the DL TCP data packet by transmitting an DL TCP ACK data packet to the server 20. In contrast to the time interval I of the no continuous data transmission in FIG. 2B, the client 10 does not necessarily respond to the server 20 with a further scheduling request.

In a second time interval II', no data may be received at the client 10 from the server 20. The second interval II' thus may correspond to a gap in the continuous part of the DL activity described in connection with FIG. 2A. A time duration $t_{cycle}$ of one cycle, i.e. between a reception of a first TCP data packet and a reception of a subsequent second data packet in the continuous DL activity may particularly be smaller than the time duration $t_{cycle}$ of one cycle in the no continuous DL activity as described above. In the following time intervals, the acts of the time intervals I' and II' may be repeated, in particular until the data transmission, e.g. the file download, between the client 10 and the server 20 may be completed. That is, a data transmission during a third time interval III' may be similar to the data transmission of the first time interval I', a data transmission during a fourth time interval IV' may be similar to the data transmission of the second time interval II', a data transmission during a fifth time interval V' (not illustrated) may be similar to the data transmission of the first time interval I', etc.

As can be seen from the above, at the start of a data transmission between the client 10 and the server 20, during the no continuous DL activity, the client 10 may be required to send scheduling requests to the server 20 as long as no stable and continuous data transmission between the client 10 and the server 20 is established. At the point where the data transmission has become stable, i.e. the size of the gaps between the transmitted data packets falls below a specific time value, no further scheduling requests may be required to be transmitted from the client 10 to the server 20.

The size of the gaps (see e.g. time intervals II and II') in FIGS. 2B and 2C may depend on various factors. For example, the gap size may depend on an application of a slow-start algorithm. Here, the gaps may be seen as idle times in which no additional data transmission is (not yet) enabled. Since the impact of the slow-start algorithm on the gap size may become irrelevant in the section of continuous DL activity, the gap size of section II may be particularly greater than the gap size of section II'. Furthermore, the gap size may depend on the number of clients that may be scheduled by the server 20. If the server 20 communicates with multiple clients, only reduced resources may be scheduled for one specific client, for example the considered client 10. In other words, the time during a gap in a communication with a first client may be used by the server 20 to communicate with a different second client. Furthermore, the gap size may depend on the round-trip delay times (RTD) (or a round-trip times (RTT)) of the transmitted data packets. The RTD (or RTT) may be defined as the time length required for a signal to be transmitted (e.g. from the server 20 to the client 10) plus the time length required for an acknowledgment of the signal to be received (e.g. from the client 10 to the server 20). Since the number of transmitted data packets may increase during the continuous data transmission and the roundtrip times may differ for different data packets, in reality, the graph of FIG. 2A may become blurred or fuzzy, in particular in the section of continuous DL activity.

Figure 2D:
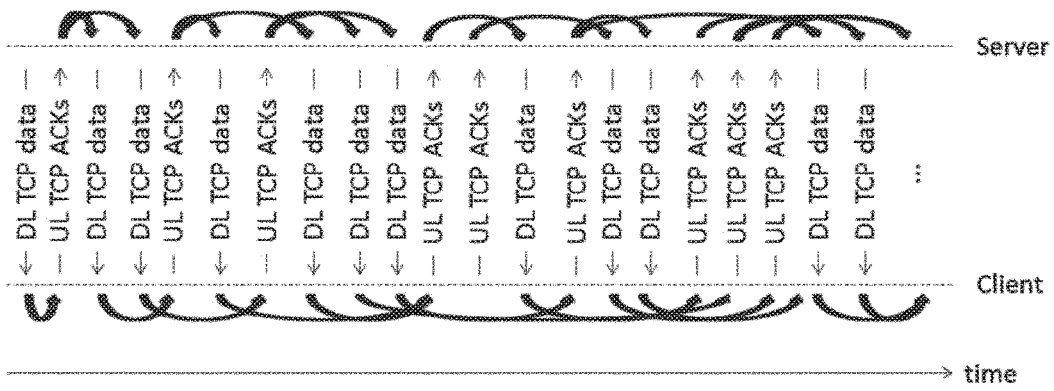
FIG. 2D schematically illustrates a data communication in a third section of the time/sequence diagram of FIG. 2A.

FIG. 2D schematically illustrates a data communication during the continuous activity. Here, DL TCP data packets may be transmitted from the server 20 to the client 10, and UL TCP ACK data packets may be transmitted from the client 10 to the server 20. In FIG. 2D, arrows at the client side indicate the DL TCP data packets and DL TCP ACK data packets that are associated with each other. As previously mentioned, due to e.g. differing roundtrip times, the associated DL TCP data packets and UL TCP ACK data packets may not necessarily be well ordered in a successive manner, but may be mixed resulting in a blurred activity as described above. There may occur time gaps between consecutive DL TCP data packets, for example because of other users being served in that respective time instances. Similarly, there may occur time gaps between consecutive UL TCP ACK data packets. It is to be noted that DL TCP data packets and UL TCP ACK data packets associated with previous DL data may be transmitted at a same time instance.

During a communication between the client 10 and the server 20, the data throughput may be limited by at, least one of a congestion window and a receive window (or transmission window). The congestion window may be configured to control and/or avoid a congestion of the data communication, for example between the server 20 and the client 10, such that a capacity of the network is not exceeded. The size of the congestion window may be calculated by estimating a degree of congestion between the client 10 and the server 20. In particular, the congestion window may be maintained by the server 20.

The receive window may be configured to control and/or avoid that a capacity of the client 10 to process data is exceeded. The receive window may determine or correspond to the amount of data that the client 10 can accept without acknowledging the server 20. In general, if the server 20 has not received an acknowledgement for a first packet it has sent to the client 10, the server 20 may stop and wait. If the wait exceeds a certain limit, the server 20 may retransmit the transmitted data packet such that the communication based on the TCP may achieve a reliable data transmission. Each TCP segment transmitted from the client 10 to the server 20 may contain a current value of the receive window. For example, if the server 20 may receive an ACK message from the client 10 which acknowledges the byte with the number 5000 and further specifies a receive window having a size of 10000 bytes, the server 20 may not necessarily transmit further data packets after having sent the byte with the number 15000, even if the set congestion window may allow such transmission.

Even if there is no packet loss in the network, the receive window may limit a throughput of the data connection between the client 10 and the server 20. Since the TCP may transmit data up to the window size before waiting for acknowledgements, the full bandwidth of the network may not always be exploited. In particular, a limitation of the throughput caused by the size of the receive window may exemplarily be specified by the following inequality: Th≤RWin/Rtt. Here, the quantity Th may denote the size of the throughput, the quantity RWin may denote the size of the receive window, and the quantity RWin may denote the size of the round-trip time for the path(s) for transmitting data packets.

The size of the receive window may be particularly indicated by the client 10 side of the TCP communication and may correspond to the amount of free receive memory the client 10 has allocated for the respective connection. Otherwise, the client 10 may risk a loss of received packets due to a lack of memory space.

According to the above said, the throughput may thus be limited by the TCP receive window. The TCP server may perform a certain flow control, for example a slow start and a congestion avoidance, and may limit the throughput also by the TCP transmission window. In one example, at the beginning of a TCP communication, the TCP receive window may not yet have sufficiently opened such that she connection throughput may be capped when the TCP transmission window is hit. Even when the receive window is hit, the wireless link may support more throughput.

Figure 3A:
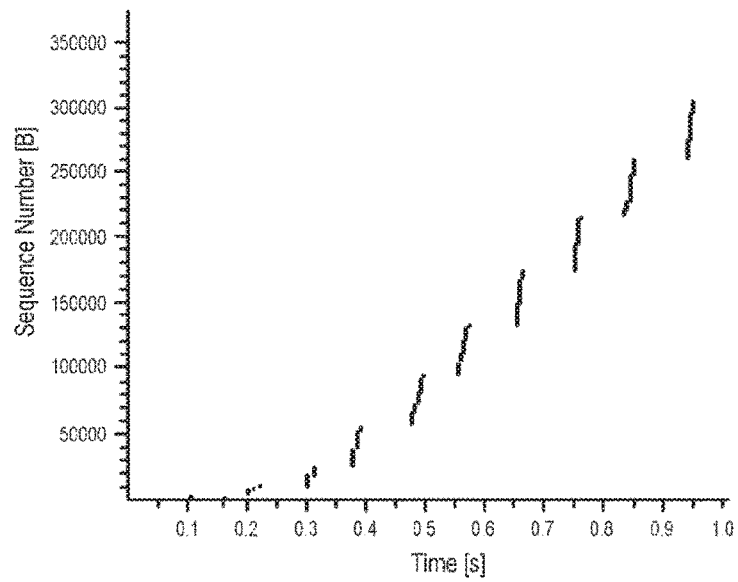
FIG. 3A shows a time/sequence diagram of a data communication between a server and a client in a second scenario.
Figure 3B:
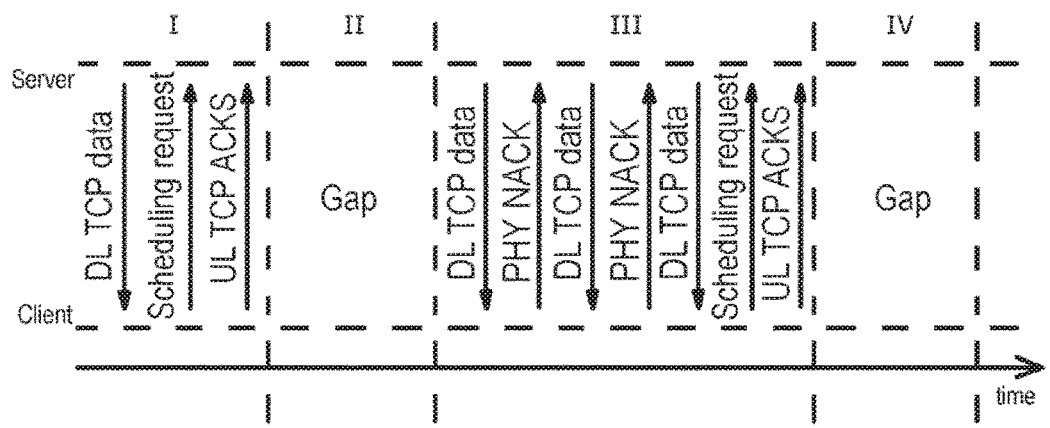
FIG. 3B schematically illustrates a more detailed view of the data communication of the time/sequence diagram of FIG. 3A.

FIG. 3 includes FIGS. 3A and 3B which illustrate a data communication between a client 10 and a server 20 in a second scenario. FIG. 3A shows a time/sequence diagram of the data communication. Comments made in connection with the diagram of FIG. 2A may also hold true for FIG. 3A. In FIG. 3A, a no continuous DL activity is shown during which the gaps between received data packets remain large. In particular, gaps between received data packets in FIG. 3A may be larger than corresponding gaps in FIG. 2A. FIG. 3A may refer to a "bad" case already mentioned above in which a data transmission between the client 10 and the server 20 may not speed up and may be blocked. Hence, the data communication in FIG. 3A does not include a transition from a no continuous DL activity to a continuous DL activity as in FIG. 2A.

FIG. 3B schematically illustrates a more detailed view of the data communication of the time/sequence diagram of FIG. 3A. In a first time interval I, the data communication may be similar to the data communication of the first time interval I of FIG. 2B. In particular, a first CRC performed by the client 10 may indicate a successful reception of a TCP data packet such that the client 10 may transmit a scheduling request and a TCP ACK in the UL. A second interval II in FIG. 3B may correspond to the second time interval II of FIG. 2B. Similar to FIG. 2B, a time duration $t_{cycle}$ of the cycle formed by the time intervals I and II in FIG. 3B may lie in range from about 50 milliseconds to about 75 milliseconds.

In a third time interval III, the server 20 may transmit a further DL TCP data packet to the client 10. After receiving the DL TCP data packet, the client 10 may perform a CRC of the received data. In the example of FIG. 3B, a first CRC at the client may indicate an unsuccessful reception of the DL TCP data packet. For example, a negative CRC may result from a high value of the Block Error Rate (BLER) in the DL direction. A high value of the BLER may result from a high value of an employed MCS. That is, the higher the chosen value for the MCS in the DL, the higher the probability or risk for a non-successful data reception at the client 10. The client 10 may transmit a PHY NACK data packet to the server 20 in order to indicate the unsuccessful reception of the DL TCP data packet. The PHY NACK data packet may be transmitted from a UE to a NodeB on a PHY layer. After receiving the PHY NACK, the server 20 may transmit the DL TCP data packet for a second time. Such retransmission of the DL TCP data packet may be performed from a NodeB to a UE on a PHY layer. A second CRC may be again unsuccessful such that the client 10 may transmit a second PHY NACK data packet to the server 20 in order to indicate that the DL TCP data packet has not been successfully received again. After receiving she second PHY NACK data packet, the server 20 may transmit the DL TCP data packet for a third time. The client 10 may then perform a CRC indicating a successful data reception of the DL TCP packet received for the third time. Hence, the client 10 may then respond with a scheduling request to transmit a TCP ACK in the UL and further to request a transmission (or the scheduling of a transmission) of a further DL TCP data packet from the server 20 to the client 10. The client 10 may thus acknowledge the reception of the DL TCP data packet by transmitting an UL TCP ACK data packet to the server 20. In a fourth time interval IV, no data may be received by the client 10 from the server 20. The fourth interval II may be similar to e.g. the second time interval II.

Due to the required re-transmissions of the DL TCP data packet in the third time interval III, a time duration $t_{cycle}$ of the cycle formed by the time intervals III and IV in FIG. 3B may be greater than the time duration $t_{cycle}$ of the cycle formed by the time intervals I and II. In one example, one single retransmission of a DL TCP data packet may require from about 7 milliseconds to about 9 milliseconds. In general, a time duration $t_{cycle}$ of a cycle requiring one or more re-transmissions of DL TCP data may lie in range from about 75 milliseconds to about 100 milliseconds.

As already discussed above, FIG. 3 may refer to a "bad" case in which a data transmission between the client 10 and the server 20 may not speed up and may be blocked such that, a transmission to a continuous DL activity may be delayed or even completely prevented. This may be caused by an increased size of time durations $t_{cycle}$ due to the required re-transmissions. It is noted that a data transmission according to a bad case may also include cycles without re-transmissions (see e.g. time interval I in FIG. 3B). Furthermore, the number of required re-transmissions for a DL TCP data packet for one cycle may be arbitrary and may vary for different data packets. For example, a first DL TCP data packet may need to be re-transmitted e.g. only once while a second DL TCP data packet may need to be re-transmitted for e.g. three or four times.

The different scenarios discussed in connection with FIGS. 2 and 3 may differ in a data throughput between the client 10 and the server 20. In an example for a good case (see FIG. 2), a data volume of about 5 MB may be received by the client 10 in less than 3 seconds, while a reception of the same data volume may be take up to 6 seconds in a had case (see FIG. 3).

Figure 4:
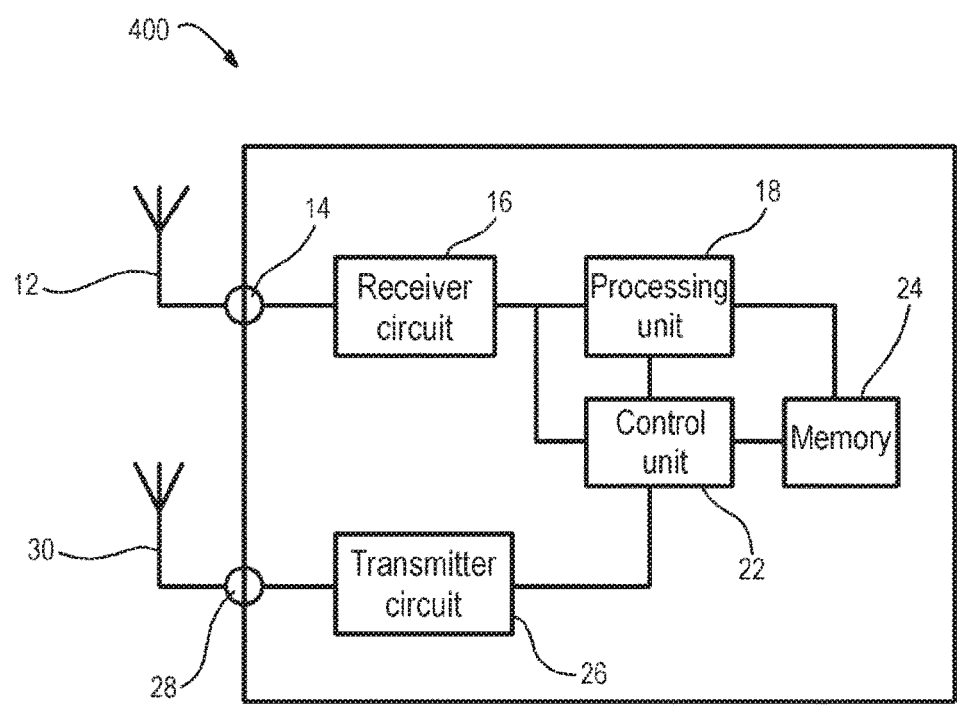
FIG. 4 schematically illustrates a User Equipment 400 in accordance with the disclosure which may operate as a client in a wireless communication system.

FIG. 4 schematically illustrates a User Equipment 400 that may operate as a client in a wireless communication system, for example the client 10 of FIG. 1. The UE 400 may be used to perform any of the methods in accordance with the disclosure described herein. For example, the UE 400 may be used in one of the scenarios described in connection with FIGS. 2 and 3.

The UE 400 may include a receive antenna 12. In FIG. 4, only one receive antenna 12 is illustrated for the sake of simplicity. However, the example of FIG. 4 may be extended to an arbitrary number of receive antennas, in particular to a case of multiple dynamic receive diversity antennas. The receive antenna 12 may be configured to receive downlink radio signals from e.g. an eNodeB that may operate as a server, for example the server 20 of FIG. 1. In addition, the receive antenna 12 may be configured to convert the received signals into electrical signals representing the received downlink signals. For the case of multiple receive antennas, the UE 400 may be configured to perform an arbitrary antenna switching scheme and/or may be based on an arbitrary dynamic receive diversity technology.

The UE 400 may further include an antenna port 14 that may provide a coupling between the receive antenna 12 and a circuit which may include components that may be configured to process the electrical signals representing the received downlink signals. For the case of multiple receive antennas, the UE 400 may include further antenna ports (not illustrated) that may be coupled to respective receive antennas.

The UE 400 may further include a receiver circuit 16 that may be coupled to the receive antenna port 14. The receiver circuit 16 may be configured to process electrical signals received from the antenna port 14. For example, the receiver circuit 16 may include or may be a part of at least one of a Rake receiver, an equalizer, an OFDM receiver, and other suitable receivers depending on the type of the considered UE or client. The receiver circuit 16 may include one or more antenna amplifiers that may be configured to amplify or attenuate the received signals. Further, the receiver circuit 16 may include an Analog-to-Digital converter (ADC) that may be configured to convert received analog signals into the digital domain. Further, the receiver circuit 16 may include one or more mixers that may be configured to mix the received signals down to a baseband (or an intermediate band). Further, the receiver circuit 16 may include one or more demodulators that may be configured to demodulate received signals and/or one or more decoders that may be configured to decode received signals. For example, the (de)modulation scheme (constellation) may be based on phase shift keying (PSK) or quadrature amplitude modulation (QAM), e.g. 16 QAM or 256 QAM. The UE 400 may include further receiver circuits (not illustrated) that may be coupled to respective receive antenna ports.

The UE 400 may further include a processing unit 18 that may be coupled to the receiver circuit 16 and configured to process signals received from the receiver circuit 16. For example, the processing unit 18 may correspond to or may include a digital signal processor or an application processor. The processing unit 18 may be configured to run one or more software programs. For example, a protocol stack software may run on the processing unit 18. Such protocol stack software may be configured to control a data transmission according to a TCP protocol between the UE 400 and a server, for example an eNodeB. In this regard, the processing unit 18 may particularly be configured to monitor a data connection between the UE 400 and the server. In one example, the processing unit 18 may particularly be configured to monitor a transmission of scheduling requests from the UE 400 to the server. In a further example, the processing unit 18 may be configured to detect a data rate based on data received from the server. In yet a further example, the processing unit 18 may be configured to detect a time duration between a reception of a first data packet from the server and a reception of a subsequent second data packet from the server. Based on a monitoring of the data connection, the processing unit 18 may particularly be configured to detect a start of a data transmission from the server.

The UE 400 may further include a control unit 22 which may be coupled to at least one of the receiver circuit 16 and the processing unit 18. The control unit 22 may be configured to adjust a data transmission between the UE 400 and the server. In particular, the control unit 22 may be configured to adjust the value of a channel quality indicator that may be transmitted to the server for a link adaptation, in particular an adaptation of an MCS for the downlink communication. For example, the channel quality indicator may be adjusted based on a detection of a start of a data transmission from the server by the processing unit 18 during its monitoring activity.

The UE 400 may further include a memory 24 that may be coupled to at least one of the processing unit 18 and the control unit 22. For example, the memory 24 may be configured to store predefined values of the channel quality indicator. The predefined values may e.g. be stored in a database and may be read out by at least one of the processing unit 18 and the control unit 22.

The UE 400 may further include a transmitter circuit 26 which may be coupled to the control unit 22 and further components of the UE 400, for example the processing unit 18. The transmitter circuit 26 may be configured to process signals that may be transmitted by the UE 400 to the serve. In this regard, the transmitter circuit 26 may particularly be configured to perform similar acts as the receiver circuit 16, in particular in a reverse fashion. For example, the transmitter circuit 26 may include an encoder to encode transmit signals, a modulator to modulate the transmit signals, a mixer for mixing the transmit signals to a required frequency band, a Digital-to-Analog converter (DAC) to convert digital signals to analog signals, one or more antenna amplifiers, etc. The transmitter circuit 28 may be coupled to an antenna port 28. The antenna port 28 may be coupled to a transmit antenna 30 for broadcasting the transmit signals to the server. The UE 400 may include further transmit antennas which are not illustrated for the sake of simplicity. Using multiple antennas at both transmit and receive may result in a multiple-input multiple-output (MIMO) system. Using diversity techniques at both ends of the link may be referred to as space-time coding. In FIG. 4, the receive antenna 12 and the transmit antenna 30 are shown as separate components of the UE 400 for illustrative purposes. In this regard, it is to be noted that in a real UE a same antenna may be used for a reception and transmission of radio signals.

Figure 5:
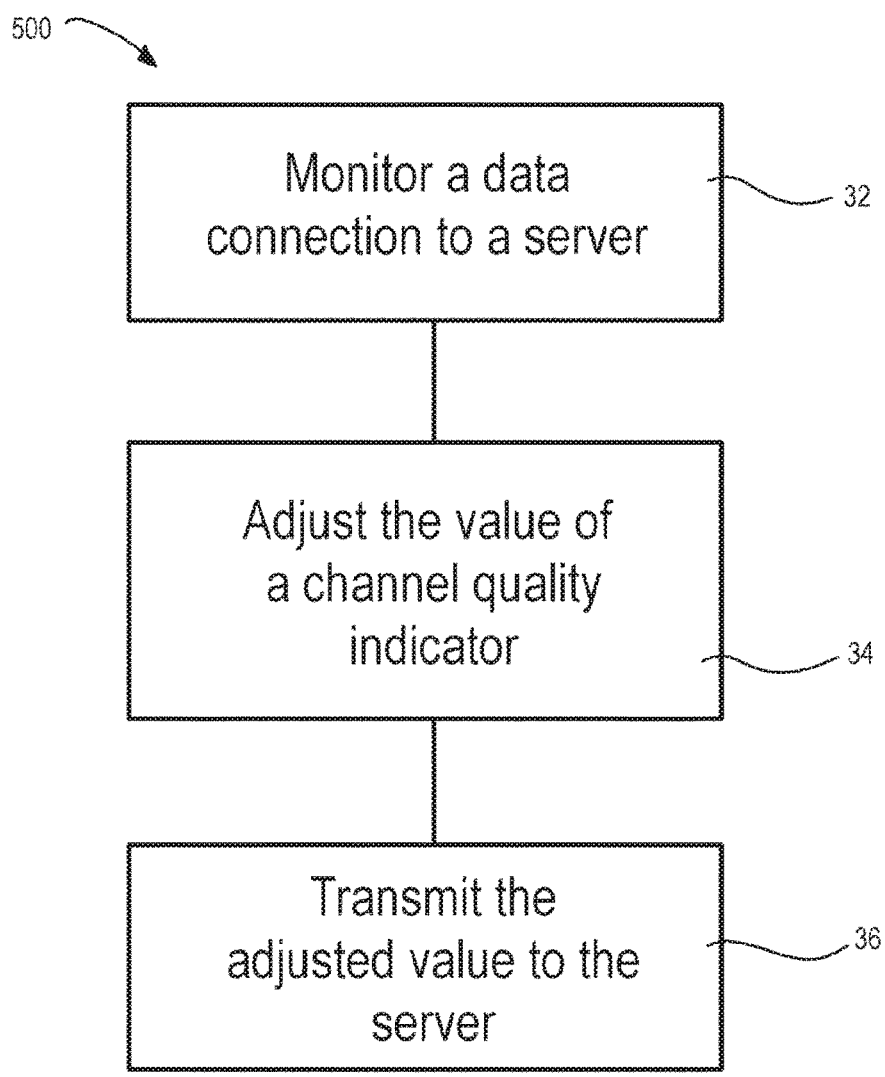
FIG. 5 schematically illustrates a method 500 in accordance with the disclosure.

FIG. 5 schematically illustrates a method 500 in accordance with the disclosure. The method 500 may be seen as an example illustrating a basic concept of the present disclosure. The method 500 may be extended by further acts, for example by one or more of the acts described in connection with the method 800 of FIG. 8.

In an act 32, a data connection to a server is monitored by a client. Referring back to FIG. 4, the client may correspond to the UE 400 which may receive data from a server. The data connection to the server may be monitored by e.g. the processing unit 18. Examples for monitoring the data connection are discussed below in connection with the method 800 of FIG. 8. In a further act 34, the value of a channel quality indicator is adjusted based on a detection of a start of a data transmission from the server. Referring back to FIG. 4, the value of the channel quality indicator may be adjusted by e.g. the control unit 22. Examples for adjusting the channel quality indicator are discussed below in connection with the method 800 of FIG. 8. In a further act 36, the adjusted value of the channel quality indicator is transmitted so the server (or base station).

Figure 6:
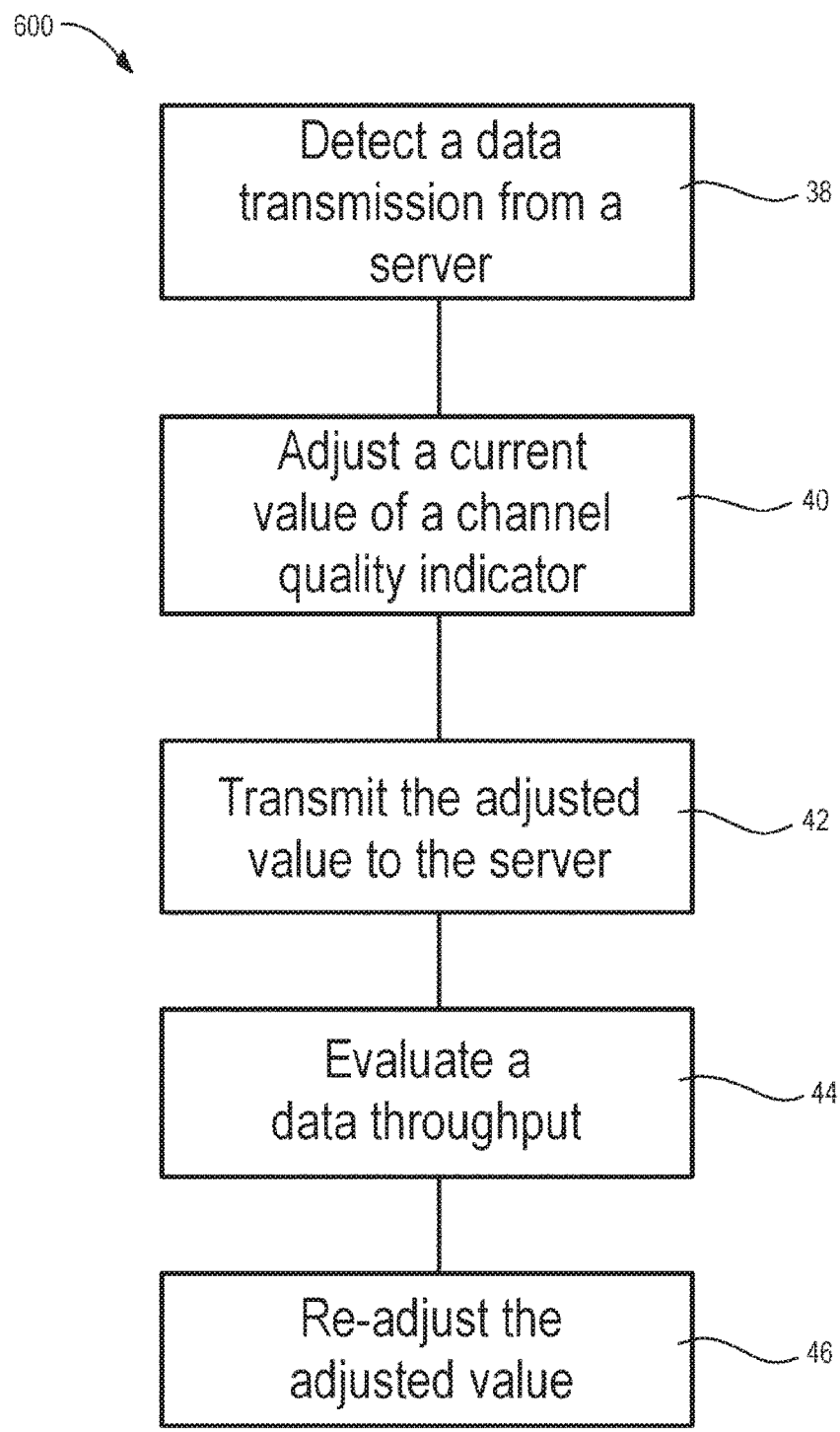
FIG. 6 schematically illustrates a method 600 in accordance with the disclosure.

FIG. 6 schematically illustrates a method 600 in accordance with the disclosure. The method 600 may be seen as an example illustrating a basic concept of the present disclosure. The method 600 may be extended by further acts, for example by one or more of the acts described in connection with the method 800 of FIG. 8.

In an act 38, a data transmission from a server is detected at a client in a further act 40, a current value of a channel quality indicator is adjusted. In a further act 42, the reduced value of the channel quality indicator is transmitted to the server. For example, the acts 38 to 42 of method 600 may be similar to the acts 32 to 36 of the method 500. In a further act 44, a data throughput of the data from the server is evaluated. Referring back to FIG. 4, the data throughput may be evaluated by e.g. the processing unit 18. Examples for evaluating a data throughput are discussed below in connection with the method 800 of FIG. 8. In a further act 46, the adjusted value of the channel quality indicator is re-adjusted if the data throughput satisfies a predetermined condition. Referring back to FIG. 4, the act 46 may be performed by e.g. the control unit 22. Examples for re-adjusting the adjusted value of the channel quality indicator are discussed below in connection with the method 800 of FIG. 8.

Figure 7:
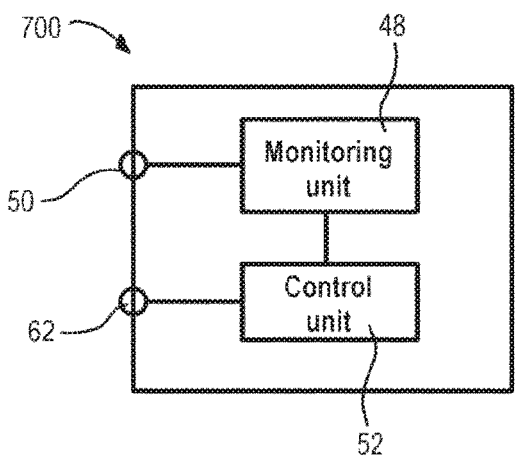
FIG. 7 schematically illustrates a device 700 configured to perform a method in accordance with the disclosure.

FIG. 7 schematically illustrates a device 700 which is configured to perform a method in accordance with the disclosure. For example, the device 700 may be configured to perform the method 500 of FIG. 5. The device 700 includes a monitoring unit 48 configured to monitor a data connection to a server. In this regard, the device 700 may optionally include an input terminal 50 to receive data on which the monitoring act may be based. The device 700 further includes a control unit 52 configured so adjust the value of a channel quality indicator based on a detection of a start of a data transmission from the server by the monitoring unit 48. The reduced value of the channel quality indicator is configured to be transmitted to the server and may be output at an optional output terminal 62 of the device 700.

The device 700 of FIG. 7 may be regarded as a basic concept of the present disclosure. Hence, the device 700 is shown in a general manner and may, of course, include further components this are not illustrated for the sake of simplicity. For example, the device 700 may further include one or more components as described in connection with FIG. 4 or components that are configured to perform one or more of the acts described on connection with the method 800 of FIG. 8. The device 400 of FIG. 4 may be seen as a more detailed implementation of the device 700.

Figure 8:
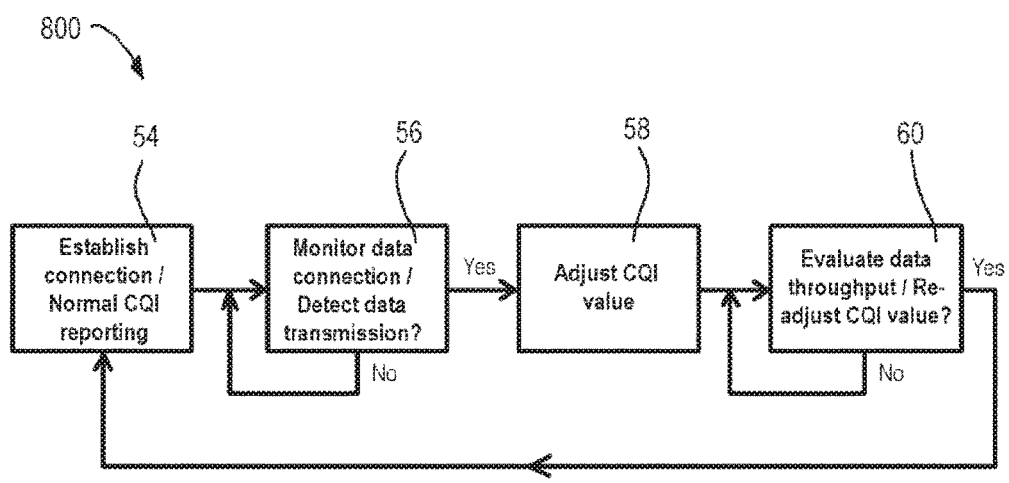
FIG. 8 schematically illustrates a method 800 in accordance with the disclosure. The method 800 may be seen as a more detailed implementation of the methods 500 and 600.

FIG. 8 schematically illustrates a method 800 in accordance with the disclosure. The method 800 may be seen as an enhanced or more detailed version of the methods 500 and 600. The method 800 may be performed by a client of a network in a communication between the client and a server, wherein the communication may e.g. be based on a TCP. For example, each of the devices 400 and 700 may be configured to perform the acts of method 800. In the following, the method 800 is described in connection with she device 400 of FIG. 4. In this case, one or more of the acts described in the following may be performed by at least one of the processing unit 18 and the control unit 22 of the device 400.

In an act 54, a connection between a client and a server may be established, in particular a full duplex connection. In one example, the connection may be based on a TCP and may be established based on a three-way handshake. During establishing the connection and before a data transmission from the server (e.g. a file download) may start, the client may report an initial CQI value to the server (or base station) in the act 54. For example, the initial CQI value may depend on information configured to identify a network operator. Such information may e.g. be stored on a subscriber identity module (SIM) or a memory of the client. Different network operators may specify different initial CQI values for a communication in their networks. The initial CQI value may be read by the client from e.g. the SIM or the memory and may be reported to the server (or base station). Based on the reported CQI value, the server (or base station) may then determine an MCS for an initial DL communication. Later on, the client (or UE) may determine CQI values that may e.g. be based on SNR measurements and report these CQI values to the server (or base station). Hence, the CQI value may change over time due to changing link or channel conditions such as e.g. SNR. A CQI value based on e.g. SNR measurements may be referred to as normal CQI value. It is noted that a communication between the client, and the server during the act 54 may particularly be based on data transmitted before an actual transmission of payload data (e.g. a download of a data file or a website) from the server to the client starts. Data transmitted during the act 54 may e.g. include signaling data, control data, data for an FTP login, data for establishing a connection between the client and the server, etc.

In a further act 56, the client may monitor the established data connection to the server. For example, the act 56 may be performed by the processing unit 18 of the device 400. In particular, an object of the monitoring act 56 may be to detect the start of a data transmission between the client and the server, wherein the start may correspond to the begin of a no continuous DL activity as described in connection with FIGS. 2A and 3A, respectively. For example, such start may correspond to the beginning of a data file download by the client from the server. Fence, the DL activity to be detected may particularly differ from the communication between the client and the server during act 54. A no continuous DL activity may occur in a good case (see FIG. 2A) or a bad case (see FIG. 3A). Thus, in a further example, an additional object of the monitoring act 56 may be to detect whether the start of a data transmission between the client and the server is based on a bad case (see FIG. 3A). Various exemplary possibilities for monitoring the data connection to the server are described below. If a start of a data communication between the client and the server is detected (see "Yes"), a further act 58 may be performed. If no start of a data communication is detected (see "NO"), the act 56 may be performed again. For example, the monitoring act 56 may be repeated periodically based on a predetermined period time.

In the further act 58, the client may adjust the value of the CQI if a start of a data transmission from the server is detected in act 56 (see "Yes"). For example, the act 58 may e.g. be performed by the control unit 22 of the device 400. Various exemplary possibilities for adjusting the value of the CQI in the act 58 are described below. The client may transmit the adjusted CQI value to the server. Based on the adjusted CQI value, the server may adapt the DL communication between the client and the server, in particular by adjusting the MCS for the DL. The client may particularly adjust the CQI value such that the MCS adjusted by the server may result in a BLER value for the DL communication for which the number of unsuccessfully received DL TCP data packets is thus reduced. Since the number of re-transmitted DL TCP data packet is reduced, the cycle times between received DL TCP data packets are reduced and the no continuous DL activity may occur according to a good case as in FIG. 2A. The data transmission between the client and the server may thus speed up and may be not blocked such that a transition to a continuous DL activity is not delayed and not prevented. If the CQI has been adjusted according to act 58, a further act 60 may be performed.

In the act 60, a data throughput between the client and the server may be evaluated by the client. For example, the data throughput may be evaluated periodically. In addition, if the data throughput satisfies a predetermined condition, the client may re-adjust the CQI value that has been adjusted in the act 58. For example, an evaluation of the data throughput may be performed by the processing unit 18 of the device 400, and a re-adjustment of the CQI value may e.g. be performed by the control unit 22 of the device 400. Various exemplary possibilities for evaluating the data throughput and re-adjusting the adjusted CQI value in the act 60 are described below. In particular, an object of the act 60 may be to determine whether a data transmission in the DL between the client and the server has entered a continuous DL activity (see e.g. FIG. 2A). When a transmission from the no continuous DL activity to the continuous DL activity was successful, the risk of a reduced data communication as in a bad case may have been reduced and the adjustment of the CQI value according to the act 58 may not be necessary anymore. Hence, if the data transmission has entered the continuous DL activity, the client may re-adjust the adjusted CQI value. In one example, the CQI value may be adjusted to the initial CQI value such that the act 54 may be performed again (see "Yes"). If the adjusted CQI value is not re-adjusted (see "No"), the act 60 may be performed again.

It is now referred back to the act 56 of FIG. 8. Examples for monitoring the data connection to the server and detecting a start of a data transmission from the server are discussed in the following. The described examples may be combined in an arbitrary fashion.

In one example, monitoring the data connection to the server in the act 56 may include an act of monitoring the data connection by means of a protocol stack software. The protocol stack software may be configured to detect the start of the data transmission from the server. For example, the software may be aware of a numbering of transmitted data packets and thus detect the transmission of a first data packet of e.g. a TCP file download. The protocol stack software may e.g. run on a processor included in the processing unit 18 of the device 400. If the start of a data transmission is detected by the protocol stack software, the protocol stack software may be configured to generate a trigger signal to trigger an adjustment of the CQI value according to the act 58.

In a further example, monitoring the data connection to the server in the act 56 may include an act of inspecting a received data packet. The client may receive a data packet and may, based on a data inspection of the data packet, detect whether the received data packet corresponds to a TCP data packet. Corresponding information may e.g. be included in a header of the data packet. For the case of a TCP data packet, the client may e.g. detect the sequence number of the data packet. If the sequence number indicates the start of a data transmission, a trigger signal may be generated to trigger an adjustment of the CQI value according to the act 58.

In a further example, monitoring the data connection to the server in the act 56 may include an act of monitoring a transmission of scheduling requests from the client to the server. Here, a data transmission from the server to the client may be detected if a transmission of scheduling requests in the UL according to a no continuous DL activity starts. In particular, the cycle times between the transmissions of subsequent scheduling requests may be an indicator whether a data transmission between the client and the server happens in the no continuous DL activity for which the CQI value may be preferably adjusted. Values for time intervals between subsequent scheduling request in the no continuous DL activity are described in connection with FIGS. 2 and 3.

In a further example, monitoring the data connection to the server in the act 56 may include detecting a data rate based on received data. The start of the data transmission from the server may be detected if the detected data rate may exceed a data rate threshold value. Here, the data rate threshold may be particularly larger than a data rate that may typically occur in the act 54. Referring back to FIGS. 2 and 3, the data rate may particularly be used to detect whether the data transmission between the client and the server lies in the section of the no continuous DL activity. For example, the data rate threshold value may lie in a range from about 500 kbps to about 5 Mbps.

In a further example, monitoring the data connection to the server in the act 56 may include detecting a time duration between a reception of a first data packet and a reception of a subsequent second data packet. The start of the data transmission from the server may be detected if the time duration is smaller than a time threshold value. Referring back to FIGS. 2 and 3, the data rate may particularly be used to detect whether the data transmission between the client and the server lies in the section of no continuous DL activity. For example, the time threshold value may lie in a range from about 50 ms to about 100 ms.

It is now referred back to the act 58 of FIG. 8. Examples for adjusting the CQI value are discussed in the following. The described examples may be combined in an arbitrary fashion.

In one example, adjusting the CQI value in the act 58 may include an act of reducing a current value of the CQI by a differential value. For example, the CQI value used in the act 54 may be reduced by a predetermined differential value. The CQI may e.g. take a value between 0 and 15. In such case, the predetermined differential value may have a value of 1, 2, 3 or 4. That is, for the exemplary case of an initial CQI value of 10 and a predetermined differential value of 2, the adjusted CQI value is 8. In one example, the differential value may depend on the current CQI value. For example, if the CQI is to be adjusted to a specific value, the differential value may need to be chosen depending on the current CQI value.

In a further example, the adjusted CQI value may be smaller than a predetermined maximum, value. For example, it may be determined by the client that the adjusted value may be not allowed to take a value greater than, for example, 10.

In a further example, the adjusted value of the channel quality indicator may depend on a number of interfering cells. In a first case the number of interfering cells may be greater than in a second case here, a reduction of the CQI value in the first case may be greater that a reduction of the CQI value in the second case.

In a further example, the adjusted value of the channel quality indicator may depend on information configured to identify a network operator. A first network operator may specify an initial CQI value that may be greater than an initial CQI value specified by a second network operator. Here, a reduction of the CQI value may be greater if the first network operator is identified than a reduction of the CQI value if the second network operator is identified.

In a further example, the adjusted CQI value may be read from a database. The CQI values stored in the database may be fixed predetermined values. Alternatively, the CQI values in the database may be updated over time depending on the outcome of previous CQI adjustments. The CQI values stored in the database may also depend on previously performed measurements based on previous adjustments of the CQI value.

In a further example, a downlink communication based on an MCS determined by the server (or base station) based on the adjusted CQI value may have a BLER of smaller than a predetermined threshold value. For example, the predetermined threshold may take a value between about 0% and about 12%. In other words, the client may adjust the CQI value such that the DL BLER is reduced to a value between about 0% and about 12%.

It is now referred back to the act 60 of FIG. 8. Examples for evaluating the data throughput and re-adjusting the adjusted CQI value in the act 60 are discussed in the following. The examples may be combined in an arbitrary fashion. In the act 60, it may be particularly required to detect if the DL activity enters a continuous phase as e.g. illustrated in FIG. 2A. In the continuous DL activity phase, the adjustment of the CQI value according to act 58 may not be necessary anymore, because the critical no continuous DL activity phase has been passed.

In one example, evaluating the data throughput in the act 60 may include an act of monitoring a transmission of scheduling requests from the client to the server. Here, the adjusted CQI value may be re-adjusted if no transmission of scheduling requests from the client to the server is detected during a time interval greater than a predetermined time threshold value. For example, the time threshold value may lie in a range from about 90 milliseconds to about 110 milliseconds, and may particularly have a value of about 100 milliseconds. Referring back to the scenario of FIG. 2A, in the section of continuous DL activity, the client may not necessarily transmit scheduling requests to the server. The status of the continuous DL activity may be detected by the described monitoring of a transmission of scheduling requests.

In a further example, evaluating the data throughput in the act 60 may include an act of detecting a data rate based on data received at the client from the server. Here, the adjusted CQI value may be re-adjusted if the detected data rate is greater than a data rate threshold value. For example, the data rate threshold value may lie in a range from about 5 Mbit per second to about 15 Mbit per second, and particularly have a value of about 10 Mbit per second. Referring back to the scenario of FIG. 2A, the state of continuous DL activity may be determined by detecting the rate of received data rate, in particular when the data rate exceeds the data rate threshold value.

In a further example, evaluating the data throughput in the act 60 may include an act of detecting a time duration between a reception of a first data packet at the client from the server and a reception of a subsequent second data packet at the client from the server. Here, the adjusted CQI value may be re-adjusted if the time duration is smaller than a time threshold value. For example, the time threshold value may lie in a range from about 10 milliseconds to about 50 milliseconds. Referring back to the scenario of FIG. 2A, the status of continuous DL activity may be detected by detecting the size of the gaps between two subsequent data packets received at the client. If the size of the gaps is smaller than the time threshold value, it may be assumed that the client already operates in the continuous DL activity section.

In a further example, evaluating the data throughput in the act 60 may include detecting a data rate based on data received at the client from the server. The adjusted CQI value may be re-adjusted if a detected data rate is smaller than a data rate threshold value for a time interval greater that a time threshold value. For example, the gap pattern in the no continuous DL activity section in a good case as in FIG. 2A may usually last for less than e.g. about 1 second. Hence, if after a time threshold value of e.g. about 2 seconds still no transition into the continuous DL activity is detected, the adjusted CQI value may be re-adjusted to, for example, the initial or normal CQI value.

In a further example, evaluating the data throughput in the act 60 may include an act of detecting a discontinuation of a data transmission between the client and the server, wherein the discontinuation may be based on a receive window. Here, the adjusted CQI value may be re-adjusted if no (or no more) discontinuation is detected. Referring back to FIG. 2A, the size of the receive window may increase with time. That is, the size of the receive window may be small at the start of a file download such that the data communication between the server and the client may be discontinued at times. In general, a discontinuation may occur in the section of no continuous DL activity and/or the section of continuous activity.

For example, detecting a discontinuation of a data transmission between the client and the server may include an act of inspecting a data packet received by the client. The client may receive a data packet and may, based on a data inspection of the data packet, detect whether the received data packet corresponds to a TCP data packet. Corresponding information may e.g. be included in a header of the data packet. For the case of a TCP data packet, the client may detect the sequence number of the data packet. Based on the known sequence number and additional information on the current receive window, it may be determined if a discontinuation of the data communication is caused by the current size of the receive window or not. A data inspection and a detection of a discontinuation may, for example, be performed by at least one of the processing unit 18 and the control unit 22 in FIG. 4.

For example, a discontinuation of a data transmission between the client and the server may be detected by a protocol stack software that may e.g. run on a digital signal processor. In particular, the protocol stack software may know at any given time the sequence numbers of the received data packets and the size of the current receive window. Based on this information, the software may determine if a discontinuation of the data communication is caused by the current size of the receive window or not. Referring back to the device 400 of FIG. 4, a TCP software running on e.g. the processing unit 18 may monitor whether the data communication between the client and the server may be discontinued based on the receive window. If an end of a discontinuation is detected, the processing unit 18 may generate a trigger signal and transmit the trigger signal to the control unit 22. After receiving the trigger signal, the control unit 22 may re-adjust the CQI value.

EXAMPLES

The following pertains to further embodiments.

Example 1 is a method at a client comprising: monitoring a data connection to a server; adjusting a value of a channel quality indicator based on a detection of a start of a data transmission from the server; and transmitting the adjusted value of the channel quality indicator to the server.

In Example 2, the subject matter of Example 1 can optionally include determining a modulation and coding scheme for a downlink communication based on the adjusted value of the channel quality indicator.

In Example 3, the subject matter of Example 1 or 2 can optionally include that adjusting the value of the channel quality indicator comprises reducing a current value of the channel quality indicator by a differential value.

In Example 4, the subject matter of Example 3 can optionally include that the differential value depends on the current value of the channel quality indicator.

In Example 5, the subject matter of one of the preceding Examples can optionally include that the adjusted value of the channel quality indicator is less than a predetermined maximum value.

In Example 6, the subject matter of one of the preceding Examples can optionally include that the adjusted value of the channel quality indicator depends on a number of interfering cells.

In Example 7, the subject matter of one of the preceding Examples can optionally include that the adjusted value of the channel quality indicator depends on information configured to identify a network operator.

In Example 8, the subject matter of one of the preceding Examples can optionally include reading the adjusted value of the channel quality indicator from a database.

In Example 9, the subject matter of one of the preceding Examples can optionally include that a downlink communication based on a modulation and coding scheme determined based on the adjusted value of the channel quality indicator comprises a block error rate of less than about 10%.

In Example 10, the subject matter of one of the preceding Examples can optionally include that monitoring the data connection to the server comprises inspecting a data packet received.

In Example 11, the subject matter of one of the preceding Examples can optionally further include, with protocol stack software, detecting the start of the data transmission from the server.

In Example 12, the subject matter of one of the preceding Examples can optionally include that monitoring the data connection to the server comprises monitoring a transmission of scheduling requests to the server.

In Example 13, the subject matter of one of the preceding Examples can optionally include that monitoring the data connection to the server comprises detecting a data rate based on data received, further comprising detecting the start of the data transmission from the server based on detecting that the data rate exceeds a data rate threshold value.

In Example 14, the subject matter of one of the preceding Examples can optionally include that monitoring the data connection to the server comprises detecting a time duration between a reception of a first data packet and a reception of a subsequent second data packet, further comprising detecting the start of the data transmission from the server based on detecting that the time duration is less than a time threshold value.

In Example 15, the subject matter of one of the preceding Examples can optionally include: after adjusting the value of the channel quality indicator evaluating a data throughput of data from the server; and re-adjusting the adjusted value of the channel quality indicator based on the data throughput.

In Example 16, the subject matter of Example 15 can optionally include that evaluating the data throughput comprises monitoring a transmission of scheduling requests to the server, further comprising re-adjusting the channel quality indicator if no transmission of scheduling requests is detected during a time interval greater than a predetermined time threshold value.

In Example 17, the subject matter of Example 15 or 16 can optionally include that evaluating the data throughput comprises detecting a data rate based on data received, further comprising re-adjusting the channel quality indicator if the detected data rate is greater than a data rate threshold value.

In Example 18, the subject matter of one of Examples 15 to 17 can optionally include that evaluating the data throughput comprises detecting a time duration between a reception of a first data packet and a reception of a subsequent second data packet, further comprising re-adjusting the channel quality indicator if the time duration is less than a time threshold value.

In Example 19, the subject matter of one of Examples 15 to 18 can optionally include that evaluating the data throughput comprises detecting a data rate based on data received, further comprising re-adjusting the channel quality indicator if a detected data rate is less than a data rate threshold value for a time interval greater that a time threshold value.

In Example 20, the subject matter of one of the preceding Examples can optionally include before detecting the start of the data transmission from the server, establishing a full duplex connection between the client and the server.

Example 21 is a method at a client comprising: detecting a data transmission from a server; adjusting a current value of a channel quality indicator based on the detection of the data transmission; transmitting the adjusted value of the channel quality indicator to the server; evaluating a data throughput of data from the server; and re-adjusting the adjusted value of the channel quality indicator if the data throughput satisfies a predetermined condition.

In Example 22, the subject matter of Example 21 can optionally include that the data transmission from the server is based on a Transmission Control Protocol.

In Example 23, the subject matter of Example 21 or 22 can optionally include that the channel quality indicator is configured to indicate the quality of a downlink channel.

Example 24 is a device comprising: a monitoring unit configured to monitor a data connection to a server; and a control unit configured to adjust a value of a channel quality indicator based on a detection of a start of a data transmission from the server by the monitoring unit wherein the device is configured to transmit the adjusted value of the channel quality indicator to the server.

In Example 25, the subject matter of Example 24 can optionally include an application processor configured to run a protocol stack software, wherein the protocol stack software is configured to detect the start of the data transmission from the server.

In Example 26, the subject matter of Example 24 or 25 can optionally include a memory configured to store pre-defined values of the channel quality indicator.

Example 27 is a device comprising: monitoring means for monitoring a data connection to a server; and control means for adjusting a value of a channel quality indicator based on a detection of a start of a data transmission from the server by the monitoring means, wherein the adjusted value of the channel quality indicator is configured to be transmitted to the server.

In Example 28, the subject matter of Example 27 can optionally include processing means for running a protocol stack software, wherein the protocol stack software is configured to detect the start of the data transmission from the server.

In Example 29, the subject matter of Example 27 or 28 can optionally include memory means for storing predefined values of the channel quality indicator.

Example 30 is a network comprising: a server; and a client, wherein the client comprises a device of one of Examples 24 to 29.

Example 31 is a computer readable medium on which computer instructions are stored which when executed by a computer, cause the computer to perform the method of one Examples 1 to 23.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g. that is functionally equivalent), even though not structurally equivalent to the disclosed structure which performs the function in the herein illustrated exemplary implementations of the disclosure. For example, the any component or structure may include a processor executing instructions in order to perform at least portions of the various functions.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

The invention claimed is:

1. A method at a client, comprising:
monitoring a data connection to a server;
adjusting a value of a channel quality indicator based on a detection of a start of a data transmission from the server;
transmitting the adjusted value of the channel quality indicator to the server; and
determining a modulation and coding scheme for a downlink communication based on the adjusted value of the channel quality indicator, wherein monitoring the data connection to the server comprises detecting a time duration between a reception of a first data packet and a reception of a subsequent second data packet, the method further comprising detecting the start of the data transmission from the server based on detecting that the time duration is less than a time threshold value.

2. The method of claim 1, wherein adjusting the value of the channel quality indicator comprises reducing a current value of the channel quality indicator by a differential value.

3. The method of claim 2, wherein the differential value depends on the current value of the channel quality indicator.

4. The method of claim 1, wherein the adjusted value of the channel quality indicator is less than a predetermined maximum value.

5. The method of claim 1, wherein the adjusted value of the channel quality indicator depends on a number of interfering cells.

6. The method of claim 1, wherein the adjusted value of the channel quality indicator depends on information configured to identify a network operator.

7. The method of claim 1, further comprising:
reading the adjusted value of the channel quality indicator from a database.

8. The method of claim 1, wherein monitoring the data connection to the server comprises inspecting a data packet received.

9. The method of claim 1, further comprising, with protocol stack software, detecting the start of the data transmission from the server.

10. The method of claim 1, wherein monitoring the data connection to the server comprises monitoring a transmission of scheduling requests to the server.

11. The method of claim 1, wherein monitoring the data connection to the server comprises detecting a data rate based on data received, the method further comprising detecting the start of the data transmission from the server based on detecting that the data rate exceeds a data rate threshold value.

12. The method of claim 1, further comprising:
after adjusting the value of the channel quality indicator, evaluating a data throughput of data from the server; and
re-adjusting the adjusted value of the channel quality indicator based on the data throughput.

13. The method of claim 12, wherein evaluating the data throughput comprises monitoring a transmission of scheduling requests to the server, the method further comprising re-adjusting the channel quality indicator if no transmission of scheduling requests is detected during a time interval greater than a predetermined time threshold value.

14. The method of claim 12, wherein evaluating the data throughput comprises detecting a data rate based on data received, the method further comprising re-adjusting the channel quality indicator if the detected data rate is greater than a data rate threshold value.

15. A method at a client, comprising:
detecting a data transmission from a server;
adjusting a current value of a channel quality indicator based on the detection of the data transmission;
transmitting the adjusted value of the channel quality indicator to the server;
evaluating a data throughput of data from the server;
re-adjusting the adjusted value of the channel quality indicator if the data throughput satisfies a predetermined condition;
determining a modulation and coding scheme for a downlink communication based on the adjusted value of the channel quality indicator, wherein evaluating the data throughput comprises detecting a time duration between a reception of a first data packet and a reception of a subsequent second data packet, the method further comprising detecting the start of the data transmission from the server based on detecting that the time duration is less than a time threshold value.

16. The method of claim 15, wherein the data transmission from the server is based on a Transmission Control Protocol.

17. A device, comprising:
a monitoring unit configured to monitor a data connection to a server; and
a control unit configured to adjust a value of a channel quality indicator based on the detection of a start of a data transmission from the server by the monitoring unit, wherein the device is configured to transmit the adjusted value of the channel quality indicator to the server, wherein the monitoring unit is further configured to
determine a modulation and coding scheme for a downlink communication based on the adjusted value of the channel quality indicator,
monitor the data connection to the server by detecting a time duration between a reception of a first data packet and a reception of a subsequent second data packet, and
detect the start of the data transmission from the server based on detecting that the time duration is less than a time threshold value.

18. The device of claim 17, further comprising:
an application processor configured to run a protocol stack software, wherein the protocol stack software is configured to detect the start of the data transmission from the server.

19. The device of claim 18, further comprising:
a memory configured to store predefined values of the channel quality indicator.

20. A device, comprising:
monitoring means for monitoring a data connection to a server; and
control means for adjusting a value of a channel quality indicator based on a detection of a start of a data transmission from the server by the monitoring means, wherein the device is configured to transmit the adjusted value of the channel quality indicator to the server, wherein the monitoring means is further for determining a modulation and coding scheme for a downlink communication based on the adjusted value of the channel quality indicator,
monitoring the data connection to the server by detecting a time duration between a reception of a first data packet and a reception of a subsequent second data packet, and
detecting the start of the data transmission from the server based on detecting that the time duration is less than a time threshold value.

21. A network, comprising:
a server; and
a client, wherein the client comprises a device, the device comprising a monitoring unit configured to monitor a data connection to a server; and
a control unit configured to adjust a value of a channel quality indicator based on the detection of a start of a data transmission from the server by the monitoring unit, wherein the device is configured to transmit the adjusted value of the channel quality indicator to the server, wherein the monitoring unit is further configured to
determine a modulation and coding scheme for a downlink communication based on the adjusted value of the channel quality indicator,
monitor the data connection to the server by detecting a time duration between a reception of a first data packet and a reception of a subsequent second data packet, and
detect the start of the data transmission from the server based on detecting that the time duration is less than a time threshold value.

22. A non-transitory computer readable medium on which computer instructions are stored which when executed by a computer, cause the computer to
monitor a data connection to a server;
adjust a value of a channel quality indicator based on a detection of a start of a data transmission from the server;
transmit the adjusted value of the channel quality indicator to the server; and
determine a modulation and coding scheme for a downlink communication based on the adjusted value of the channel quality indicator, wherein monitoring the data connection to the server comprises detecting a time duration between a reception of a first data packet and a reception of a subsequent second data packet, the method further comprising detecting the start of the data transmission from the server based on detecting that the time duration is less than a time threshold value.

* * * * *